(12) United States Patent
Oner et al.

(10) Patent No.: US 11,589,625 B2
(45) Date of Patent: Feb. 28, 2023

(54) SMART GLOVE

(71) Applicant: TIM AKILLI KIYAFETLERI VE BILISIM TEKNOLOJISI ANONIM SIRKETI, Istanbul (TR)

(72) Inventors: Rahim Oner, Istanbul (TR); Kadir Erten, Istanbul (TR); Kadir Demircioglu, Istanbul (TR)

(73) Assignee: TIM AKILLI KIYAFETLERI VE BILISIM TEKNOLOJISI ANONIM SIRKETI, Istanbul (TR)

( * ) Notice: Subject to any disclaimer, the term of this patent is extended or adjusted under 35 U.S.C. 154(b) by 0 days.

(21) Appl. No.: 17/299,320

(22) PCT Filed: Nov. 29, 2019

(86) PCT No.: PCT/TR2019/051010
§ 371 (c)(1),
(2) Date: Jun. 3, 2021

(87) PCT Pub. No.: WO2020/117166
PCT Pub. Date: Jun. 11, 2020

(65) Prior Publication Data
US 2022/0053854 A1 Feb. 24, 2022

(30) Foreign Application Priority Data

Dec. 3, 2018 (TR) .................................. 2018/18450

(51) Int. Cl.
*G06K 7/04* (2006.01)
*A41D 19/00* (2006.01)
(Continued)

(52) U.S. Cl.
CPC .......... *A41D 19/0027* (2013.01); *A41D 1/002* (2013.01); *G06K 7/10881* (2013.01); *G06K 7/10891* (2013.01); *G06F 3/014* (2013.01)

(58) Field of Classification Search
CPC ............... A41D 1/002; G06K 7/10881; G06K 7/10891; G06K 7/10396; G06F 1/163; G06F 3/044
(Continued)

(56) References Cited

U.S. PATENT DOCUMENTS 9,104,271 B1 * 8/2015 Adams .................... G06F 3/014
10,277,386 B2 * 4/2019 Raj .......................... H04L 67/12
(Continued)

*Primary Examiner* — Daniel St. Cyr
(74) *Attorney, Agent, or Firm* — Bayramoglu Law Offices LLC

(57) ABSTRACT

A smart glove includes a glove for housing and triggering electronic modules having a sensor; a triggering member for triggering the electronic modules; and a slide provided on the glove for partially or completely enclosing the electronic modules. The slide is made of a flexible material and comprises a base; two side walls extending from two side portions of the base; two channels extending starting from a first end of the base towards a second end of the base; a protrusion connected to the base from a connection end of the protrusion and extending between a channel; a lock end located at an end of the protrusion not connected to the base and extending from the protrusion perpendicularly or in an angled manner; a slot provided on an opposite end of the base without the lock end, comprising a hollow and extending from the base towards a roof.

18 Claims, 9 Drawing Sheets

(51) Int. Cl.
*A41D 1/00* (2018.01)
*G06K 7/10* (2006.01)
*G06F 3/01* (2006.01)

(58) Field of Classification Search
USPC ............ 235/462.44, 462.45, 462.46, 472.02
See application file for complete search history.

(56) References Cited

U.S. PATENT DOCUMENTS

2016/0161301 A1* 6/2016 Guenther ............ A61B 5/6825
　　　　　　　　　　　　　　　　　　　　　　702/150
2018/0117447 A1* 5/2018 Tran ...................... A63B 71/145
2018/0296878 A1* 10/2018 Copelan ................ G06F 1/3228
2019/0099123 A1* 4/2019 Zambriski ............ A61B 5/7445
2021/0223005 A1* 7/2021 Janssen .................. H04W 4/80

* cited by examiner

FIG. 2
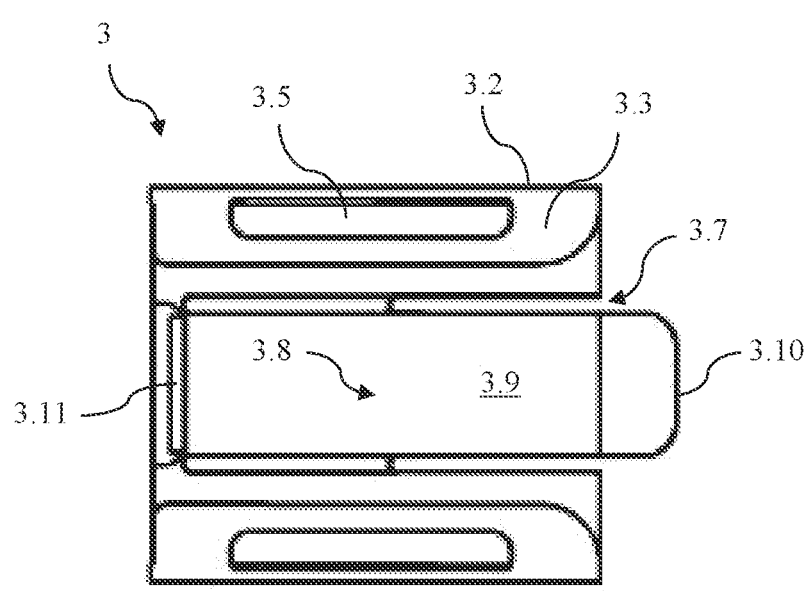
FIG. 3                    FIG. 4
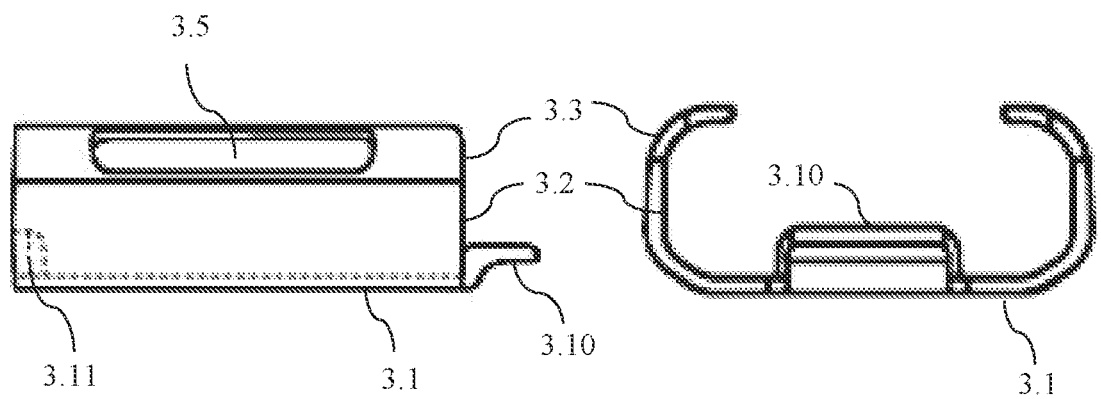
FIG. 5
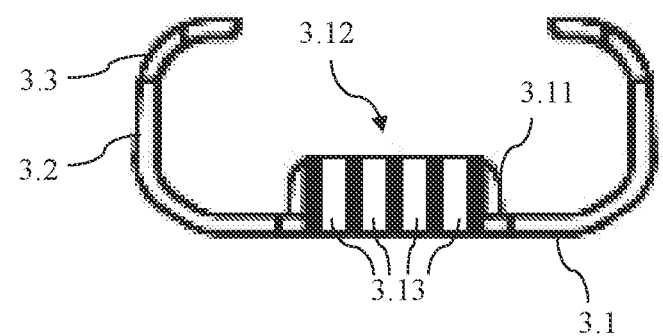

FIG. 7
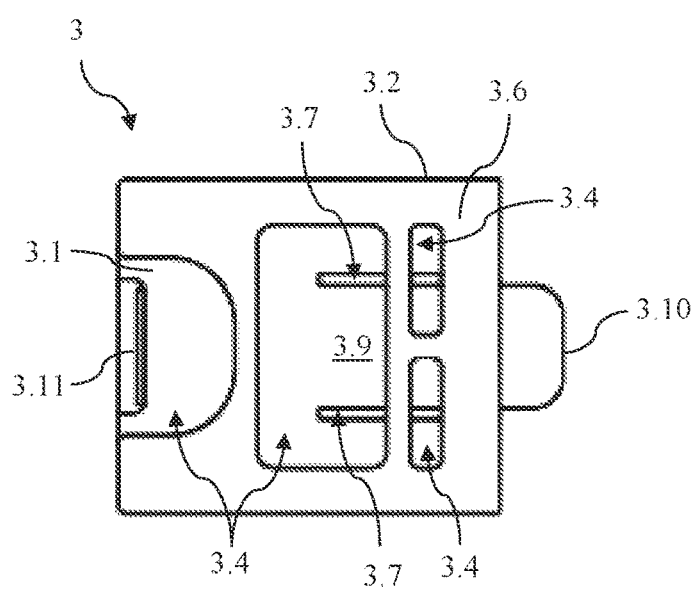
FIG. 8
FIG. 9
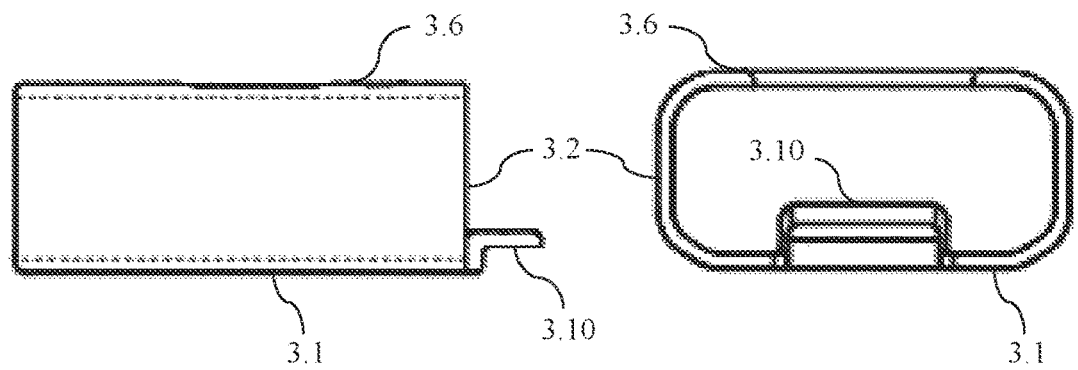
FIG. 10
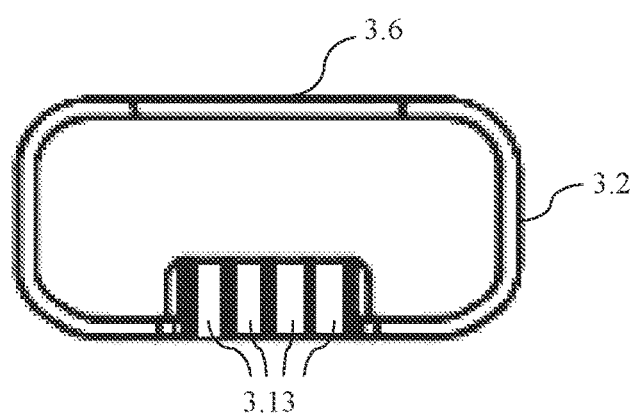

SMART GLOVE

CROSS REFERENCE TO THE RELATED APPLICATIONS

This application is the national stage entry of International Application No. PCT/TR2019/051010, filed on Nov. 29, 2019, which is based upon and claims priority to Turkish Patent Application No. 2018/18450 filed on Dec. 3, 2018, the entire contents of which are incorporated herein by reference.

TECHNICAL FIELD

The present invention relates to wearable sensors.

BACKGROUND

Wearable sensors are used in factories, especially in production lines and logistics areas for saving time and energy, reducing error rates or increasing productivity etc.

The United States patent document no. US20170338610 A1, an application known in the state of the art, discloses a glove comprising an electronic module, a holder with clips for securing the electronic module and a button for activating the electronic module. However there is no element in this document for protecting the electronic module against the effects of impacts. Again in this document, the button is positioned next to the index finger and is not provided with any protection. Therefore, the button becomes active in cases of impacts or accidental situations. Again in this document, the pins on the electronic component of the glove are located below the electronic component. Therefore, the device wears out more quickly and its lifespan is reduced.

The United States patent document no. US20180146720A1, another application in the state of the art, discloses a glove comprising a button surrounded by a rigid protective element. However in this document the button is provided in the palm. In order to press the button, the fingers of the user make a flexion movement. During this movement, the flexor digitorum profundus, flexor superficialis and lumbricalis are activated and full range of motion is achieved. This exhausts the muscles. In addition, not every person is able to reach full range of motion easily. For such people, this type of movement overstrains the tendons and causes diseases such as carpal tunnel.

In these prior art documents, bonding techniques are used at the element which provides data transmission between the triggering button and the slide. There are conductive cables inside the bonded material. This element presents a rigid use in materials such as gloves having flexible use, and is uncomfortable. In addition, it is susceptible to cable breakage due to its inflexibility, and therefore the lifespan of the device decreases.

Industrial gloves vary according to their field of use. For example, in the area where aluminum parts are collected, there are specific knitting (weaving-density of the yarns) and coating properties for occupational health and safety standards. However, in other areas, for example spare parts in warehouses or production lines, gloves with different properties are used. In the said documents, uniform (single type) gloves are used.

SUMMARY

The objective of the present invention is to provide a smart glove comprising a cage-shaped slide for protection of the electronic equipment contained therein. By means of the said slide member, while this disposable member is getting worn out, the electronic equipment containing a sensor is protected. This slide member is made of flexible materials such as plastic, and it prevents the main equipment from getting damaged by making a stretching movement in the event of an impact.

In the present invention, the electronic equipment, which is detachable and contains sensors, has male-design characteristics and specific protrusions. The disposable module, which is provided on the glove, has a female-design form and a locking mechanism is activated as soon as the product is inserted.

In the present invention, the pins are located not on the base but on the rear side of the electronic equipment, and spring pins are used. This way, the wearing out rate of the system is reduced and the lifespan thereof is increased.

Another objective of the present invention is to provide a protective element that prevents accidental pressing of the triggering member. In the present invention, the triggering member is surrounded by an element made of plastic and the like to keep the triggering member at a lower side. This way, in case of an impact or accidental situations, this plastic element damps the forces so that the triggering member cannot be activated. Thus the triggering member can only be activated by the trigger finger.

In the present invention, data transmission is provided by conductive yarns instead of cables. These spun and twistable yarns act as normal textile material. A more flexible structure is obtained by means of this mobility. This way, inconveniences that may occur due to the cable can be prevented. In addition, since problems like cable breakage are not encountered thanks to this structure, the lifespan of the smart glove increases. Additionally, the weight of the smart glove is reduced by using conductive yarns. Additionally, the use of conductive yarn provides the advantage of tensile strength. Conductive yarns allow electroconductive transmission of less than 10 k$\Omega$/m and conductive yarns have a low resistance level which is ideal for static distribution.

In the present invention, a button is used as the triggering member and is positioned next to the index finger. In this case, the thumb makes an adduction movement. This movement activates the adductor pollicis muscle. The individual does not have to reach full range of motion in order to press the button. Thus, the individual uses fewer muscles and gets less tired. This in turn contributes to both occupational safety and productivity.

Thanks to the structure that can be integrated in a flexible manner in the present invention, it can be easily integrated into all gloves that are woven from yarn according to customer requirements by sewing conductive thread and adding button and slide elements to all the gloves regardless of the coating structure and weaving type.

BRIEF DESCRIPTION OF THE EMBODIMENTS

A smart glove developed to fulfill the objectives of the present invention is illustrated in the accompanying figures, in which:

FIG. 2 is a top view of the slide in FIG. 1.

FIG. 3 is a side view of the slide in FIG. 1.

FIG. 4 is a front view of the slide in FIG. 1.

FIG. 5 is a rear sectional view of the slide in FIG. 1.

Figure 6:
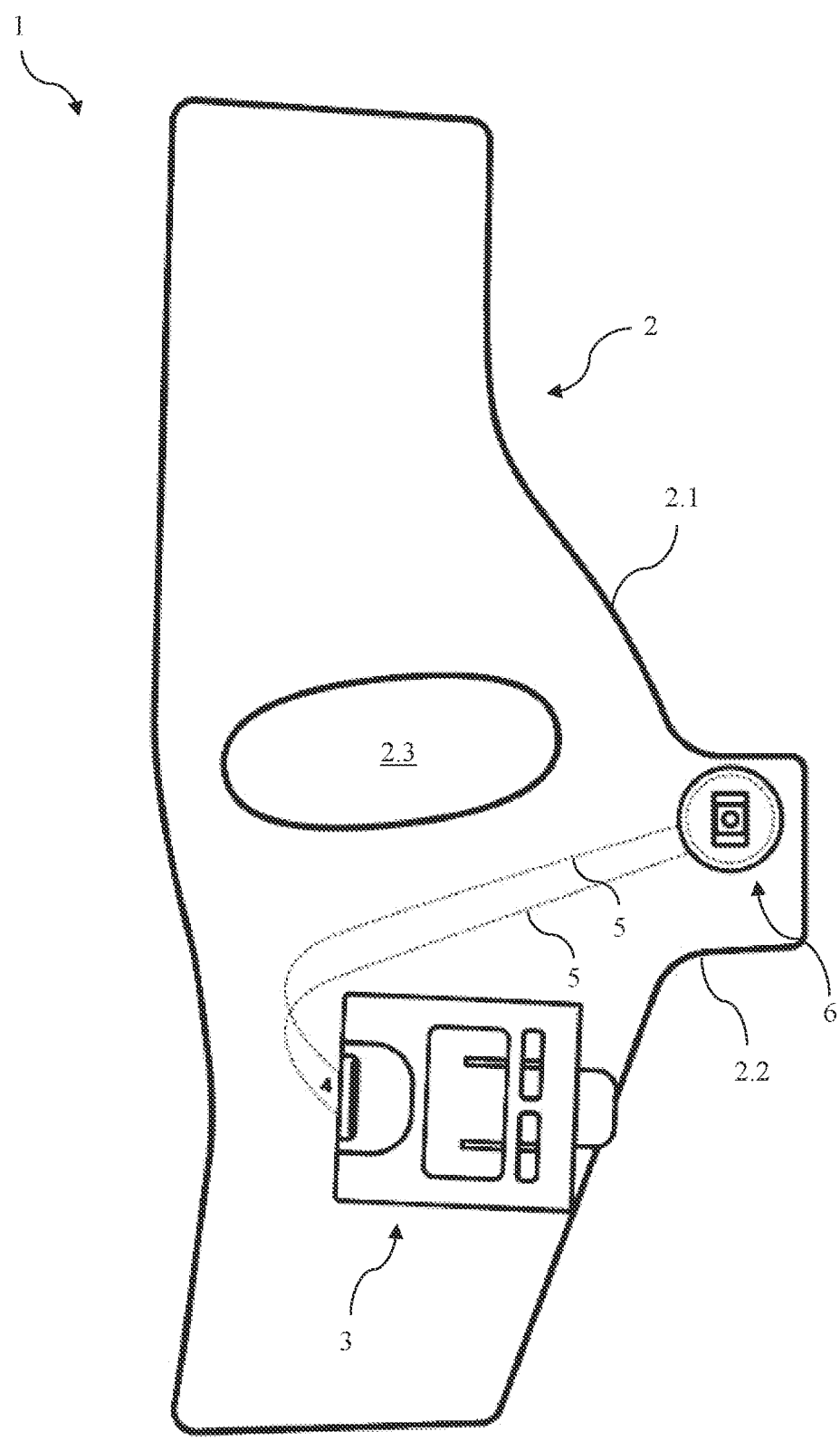
FIG. 6 is a top view of the smart glove used in another embodiment of the invention.
Figure 11:
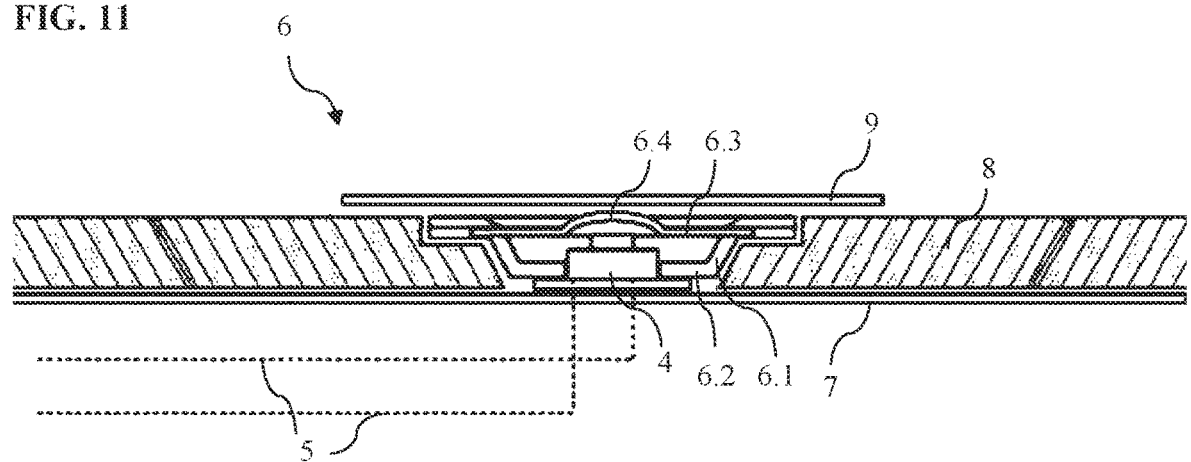
Figure 12:
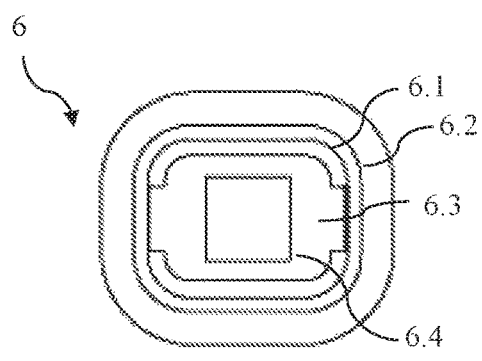
Figure 13:
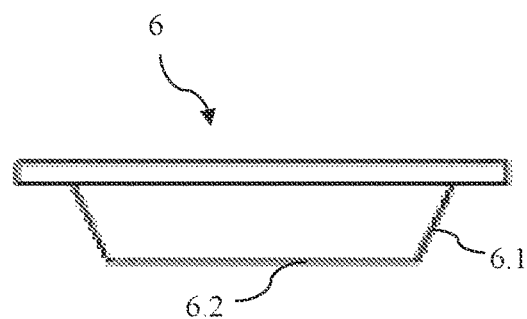
Figure 14:
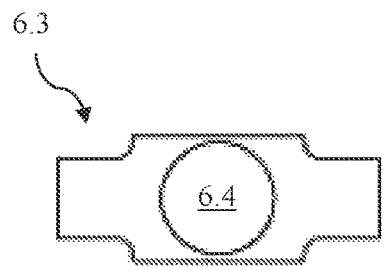
Figure 15:
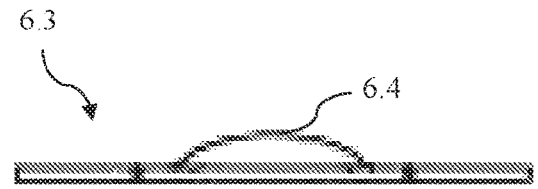
Figure 16:
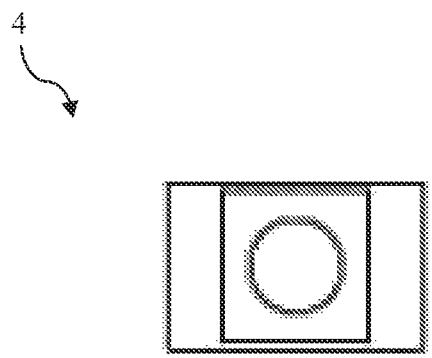
Figure 17:
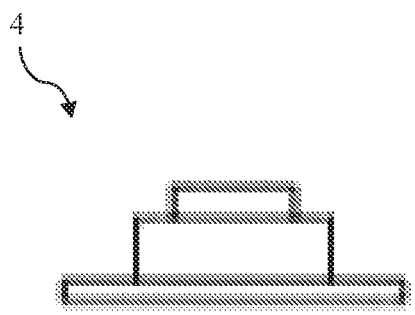
Figure 18A:
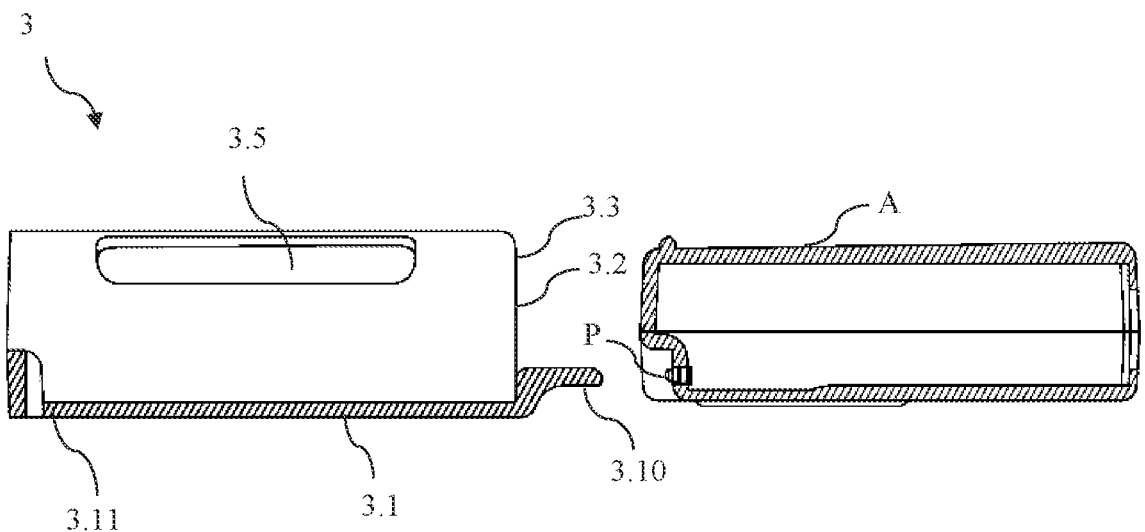
Figure 18B:
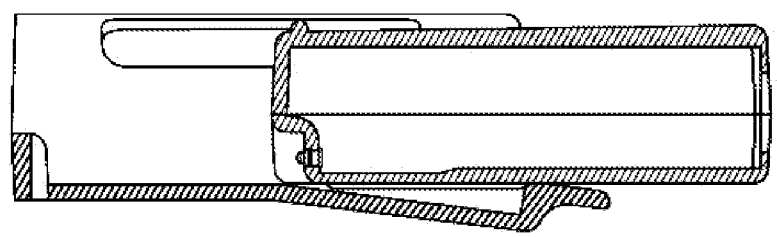
Figure 18C:
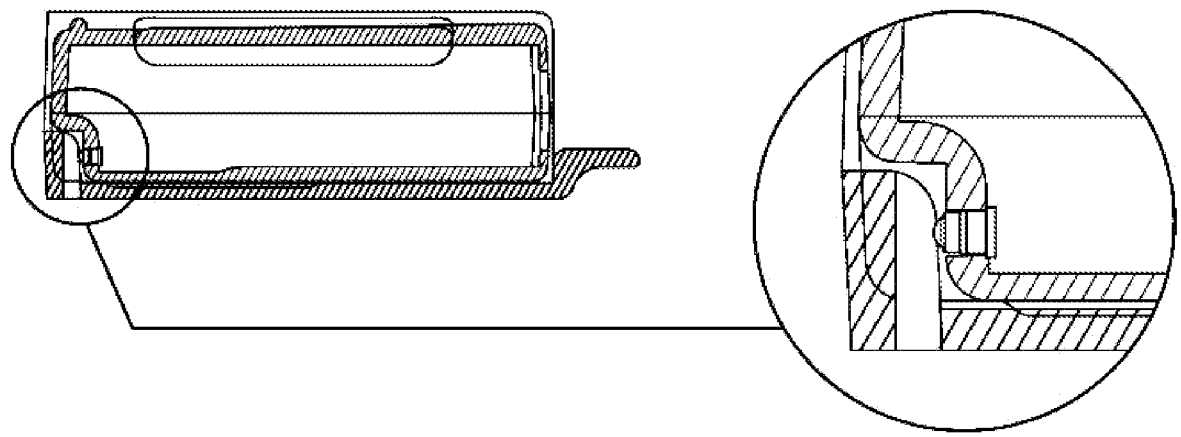
Figure 19A:
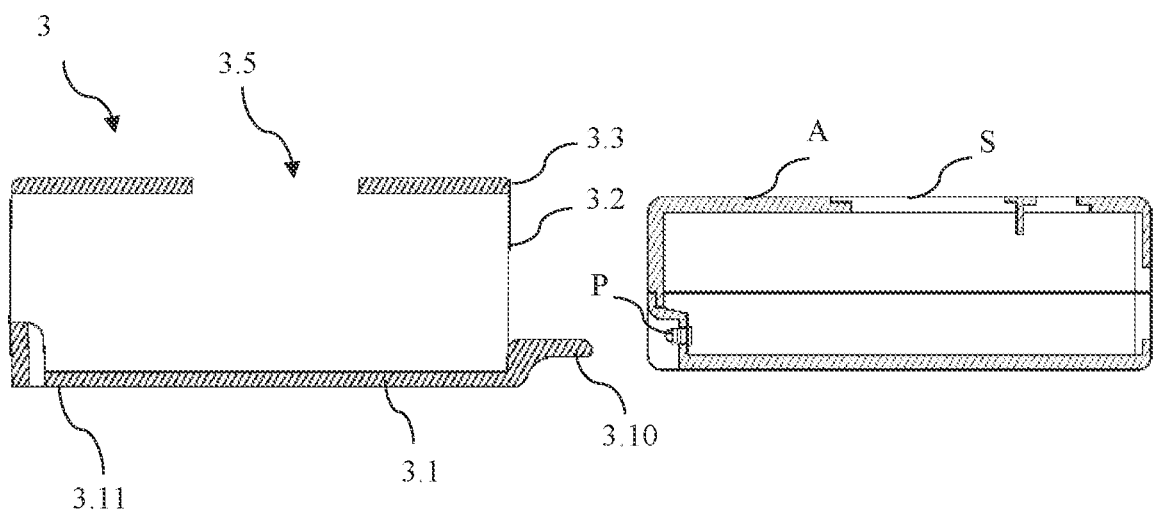
Figure 19B:
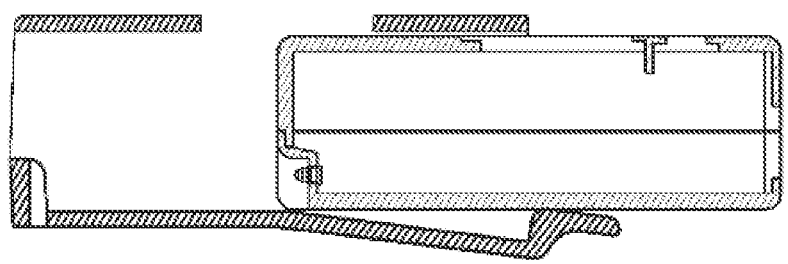
Figure 19C:
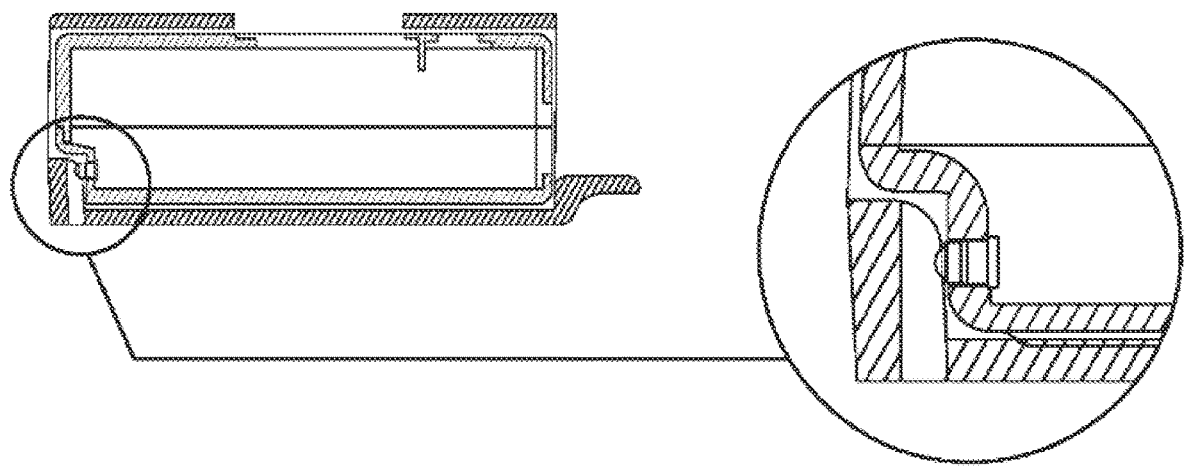

FIG. 7 is a top view of the slide in FIG. 6.
FIG. 8 is a side view of the slide in FIG. 6.
FIG. 9 is a front view of the slide in FIG. 6.
FIG. 10 is a rear sectional view of the slide in FIG. 6.
FIG. 11 is a sectional view of the protective element of the triggering member.
FIG. 12 is a top view of the protective element.
FIG. 13 is a side view of the protective element.
FIG. 14 is a top view of the middle layer.
FIG. 15 is a side view of the middle layer.
FIG. 16 is a top view of the triggering member.
FIG. 17 is a side view of the triggering member.
FIG. 18A shows sectional views of the slide and the electronic module in a state when they are separate.
FIG. 18B shows sectional views of the slide and the electronic module in a state when they are being connected.
FIG. 18C shows sectional views of the slide and the electronic module in a state when they are connected.
FIG. 19A shows other sectional views of the slide and the electronic module in a state when they are separate.
FIG. 19B shows other sectional views of the slide and the electronic module in a state when they are being connected.
FIG. 19C shows other sectional views of the slide and the electronic module in a state when they are connected.

The components in the figures are given reference numbers as follows:
1. Smart glove
2. Glove
   2.1. Main part
   2.2. Finger part
   2.3. Finger opening
3. Slide
   3.1. Base
   3.2. Side wall
   3.3. Gripping end
   3.4. Upper clearance
   3.5. Side aperture
   3.6. Upper wall
   3.7. Channel
   3.8. Connection end
   3.9. Protrusion
   3.10. Lock end
   3.11. Slot
   3.12. Printed circuit board
   3.13. Contact member
4. Triggering member
5. Conductive material (conductive yarn)
6. Protective element
   6.1. Protective wall
   6.2. Protective base
   6.3. Middle layer
   6.4. Protuberance
7. Lining
8. Fabric
9. Leather
A. Main body
E. Electronic module
G. Recess
P. Pin
S. Screen

DETAILED DESCRIPTION OF THE EMBODIMENTS

Figure 1:
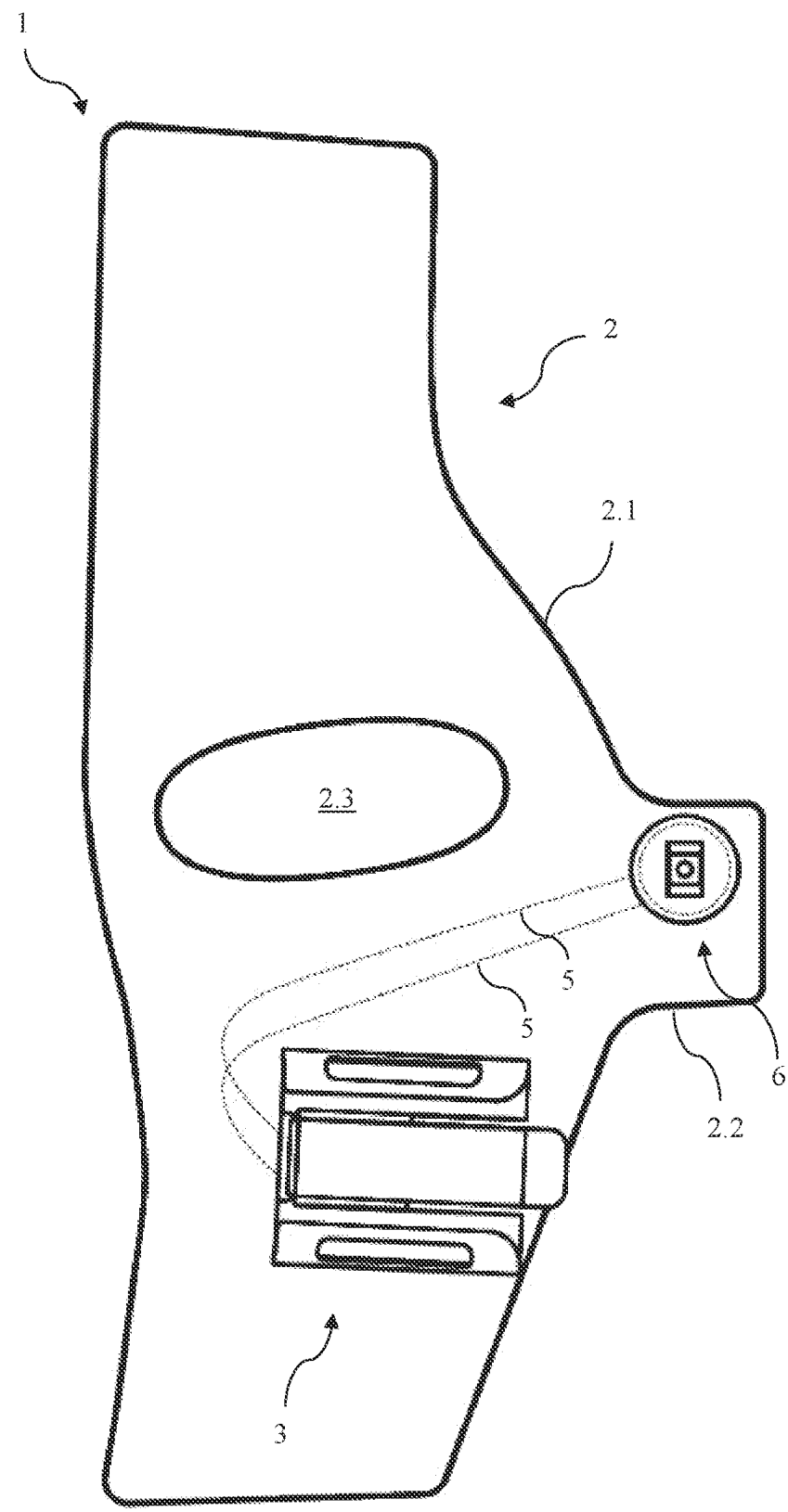
FIG. 1 is a top view of the smart glove used in one embodiment of the invention.

The smart glove (1) according to the present invention essentially comprises a glove (2); a slide (3) provided on the glove (2) for partially or completely enclosing an electronic module (E) including a sensor; a triggering member (4) for triggering the said electronic module (E); and a conductive material (5) which provides the electrical connection between the triggering member (4) and the slide (3) (FIG. 1, FIG. 6).

The said glove (2) may be a normal glove and preferably comprises a main part (2.1) for covering at least the upper surface of the hand; a band (not shown in the figures) connecting the two side portions of the main part (2.1); a finger part (2.2) for covering the user's index finger partially or completely; and a finger opening (2.3) provided on the main part (2.1) so that the user's thumb can pass through it.

The electronic module (E) used in one embodiment of the invention comprises a main body (A) preferably having a square or rectangular geometry; a screen (S) preferably located on the upper surface of the main body (A) and preferably at least one selection button; a power supply (e.g. a battery) provided within the main body (A); a sensor (e.g. a barcode reader located on the front surface of the main body (A)), pins (P) for receiving electrical signals preferably provided on the rear surface of the main body (A); and at least one spring positioned at the area where the pins (P) are connected to the main body (A) for applying pre-pressure on the pins (P) so as to push the pins (P) outwardly (FIGS. 17-18).

The said slide (3) is made of a flexible material such as plastic, preferably polycarbonate, and has a shock-damping feature. Thus, an electronic module (E) that will be inserted in the slide (3) is protected against external impacts.

In a preferred embodiment of the present invention, the said slide (3) comprises a base (3.1), two side walls (3.2) extending from two side portions of the base (3.1), and two gripping ends (3.3) extending towards each other from the ends of the side walls (3.2) away from the base (3.1).

The said gripping ends (3.3) extend from above the side walls (3.2) in an angled, curved or perpendicular manner, and form a part of the roof of the slide (3), and cover the top of the electronic module (E) that will be inserted into the slide (3) thereby protecting the electronic module (E) within the slide (3). In this embodiment of the present invention, the said gripping ends (3.3) are independent from each other, and there is an upper clearance (3.4) between these gripping ends (3.3). This way, a screen (S) provided on the upper surface of the electronic equipment to be inserted into the slide (3) can be easily seen. Each of the gripping ends (3.3) also has a side aperture (3.5) thereon, but the invention is not limited thereto, and the said side openings (3.5) may also be provided in the curved portion where the gripping ends (3.3) are united with the side walls (3.2). These side openings (3.5) enable to receive feedback from the electronic module (E) that will be inserted into the slide (3) and also enable the gripping ends (3.3) to be stretched when inserting the electronic module (E) into the slide (3) thereby allowing the electronic module (E) to be inserted into the slide (3) more easily (FIGS. 2-5).

In another preferred embodiment of the present invention, the said slide (3) comprises a base (3.1), a side wall (3.2) extending from two side portions of the base (3.1), and an upper wall (3.6) connecting the side walls (3.2) at the top. The said upper wall (3.6) extends from above the side walls (3.2) in a curved or perpendicular manner, and forms the roof of the slide (3), and covers the top of the electronic module (E) that will be inserted into the slide (3) thereby housing the electronic module (E) within the slide (3). In this embodiment of the present invention, at least one and preferably more than one upper clearance (3.4) is/are provided on the said upper wall (3.6). This way, a screen (S), a selection button, etc. provided on the upper surface of an electronic equipment to be inserted into the slide (3) can be easily seen.

In any one of the abovementioned embodiments of the invention, there are two channels (3.7), preferably extending parallel to each other, provided on the base (3.1) of the slide (3), however the invention is not limited thereto, and the said channels may extend in a straight or different geometry such that they are moving towards or moving away from each other. The said channels (3.7) extend starting from one end of the base (3.1) preferably towards the middle portion of the base (3.1). In an embodiment of the present invention, the channels (3.7) extend starting from one end of the base (3.1) to the middle portion of the base (3.1) or to a point between one of the opposite ends of the base (3.1) and the middle portion of the base (3.1). Thus, these two channels (3.7) form a protrusion (3.9) connected to the base (3.1) from a single side thereof, i.e. the connection end (3.8); and the said protrusion (3.9) can stretch upwards (towards the roof) or downwards (out of the base (3.1)) via the said connection end (3.8).

In any one of the abovementioned embodiments of the invention, there is a lock end (3.10) which forms the other end of the protrusion (3.9) which is not connected to the base (3.1). This lock end (3.10) extends from the protrusion (3.9) upwards (towards the roof) perpendicularly or in an angled manner. When inserting an electronic module (E) into the slide (3), the lower surface of the said electronic module (E) contacts the lock end (3.10) and this contact stretches the lock end (3.10) and thus the protrusion (3.9) moving it downwards from the connection end (3.8) (FIG. 1813, FIG. 1913). When the electronic module (E) is fitted into the slide (3), the protrusion (3.9) stretches in the opposite direction and comes back to a position parallel to the base (3.1) (FIG. 18C, FIG. 19C). In addition, the movement of the electronic module (E) in a lateral direction is limited by means of the upward extension of the lock end (3.10), preventing the electronic module (E) from sliding outwards. When the electronic module (E) is intended to be removed from the slide (3), a force is applied to the lock end (3.10) so that the protrusion (3.9) stretches downwards, thus the electronic module (E) is enabled to be easily removed from the slide (3).

In any one of the abovementioned embodiments of the invention, the base (3.1) has a slot (3.11) on its other opposite end without a lock end (3.10). This slot (3.11) has a certain width and wall thickness, and extends from the base (3.1) towards the roof. By means of the said slot (3.11), movement of the electronic module (E) in the other lateral direction within the slide (3) is limited. Therefore, by means of the said lock end (3.10), side walls (3.2), gripping ends (3.3) and slot (3.11); the electronic module (E) is prevented from sliding again outwardly without an external interference after being inserted into the slide (3) and a linear locking is achieved from all directions. This slot (3.11) also includes a space for inserting a printed circuit board (3.12). On the said printed circuit board (3.12), there are contact members (3.13) (conductive members) corresponding to the pins (P) provided on the electronic module (E). These contact members (3.13) are connected to the triggering member (4) by means of the conductive material (5), and enable the signal from the triggering member (4) to be transmitted to the pins (P) on the electronic module (E) and thus to the electronic module (E).

In one embodiment of the present invention, the conductive material (5) can be at least one of conductive yarns sewn to the glove (2), conductive dye and conductive wire, or may comprise at least two of them.

In any one of the abovementioned embodiments of the invention, a protective element (6) is provided for preventing the triggering member (4) from being triggered in cases where the triggering member (4) is unintentionally hit. (FIGS. 12-13, FIGS. 16-17). The said protective element (6) comprises a protective wall (6.1), which surrounds the triggering member (4) and whose height is as high as the height of the triggering member (4) or preferably higher than the triggering member (4); a protective base (6.2) including a lower aperture through which the triggering member (4) can pass; and a middle layer (6.3) including a protuberance (6.4) in its middle portion preferably extending in the opposite direction of the protective base (6.2).

The said protective element (6) is preferably made of a flexible material such as plastic. When viewed from the top, the protective element (6) is in the form of a pit in which only the thumb can enter, and when viewed from the side it is in the form of a bowl. Hence, external impacts from large objects acting on the triggering member (6) are prevented by the protective wall (6.1) and thus the triggering member (4) can only be triggered using the thumb.

The said protuberance (6.4) is preferably in the form of a hollow hemisphere, but the invention is not limited thereto, and it can also have square, rectangular, and other similar geometries. When the protuberance (6.4) located in the middle layer (6.3) positioned on the upper part of the said triggering member (4) is pressed with the thumb, this protuberance (6.4) collapses and contacts the triggering member (4). Thus, the triggering member (4) is activated (FIGS. 14-15).

In one embodiment of the invention, there is a lining (7) below the triggering member (4), fabric (8) on the sides thereof and leather (9) above the triggering member, and the assembly of the triggering member (4) is realized in this way (FIG. 11). The conductive material (5) is coupled to the lower surface of the triggering member (4). The said conductive material (5) extends towards the printed circuit board (3.12) and contacts the contact elements (3.13) provided in the printed circuit board (3.12).

The principle of operation of the invention is as follows: when the user presses the triggering member (4) on the glove (2), the signal coming from this triggering member (4) is transferred to the printed circuit board (3.12) via the conductive material (5). This signal is transmitted to the sensor, for example a barcode reader, in the electronic module (E), by means of the pins (P) of the electronic module (E) which contact the contact members (3.13) on the printed circuit board (3.12), and the said sensor is triggered. When the said sensor is triggered, the related barcode is read and recorded in the electronic module (E). However, the said sensor is not limited to a barcode reader, but different sensors can also be used.

What is claimed is:
1. A smart glove for housing and triggering electronic modules having a sensor, comprising
   a glove,
   a triggering member for triggering the electronic modules,
   a slide made of a flexible material provided on the glove for partially or completely enclosing the electronic modules; the slide comprises:
      a base;
      two side walls extending from two side portions of the base;

two channels extending starting from a first end of the base towards a second end of the base, wherein the two channels are formed in a surface of the base;

a protrusion connected to the base from a connection end of the protrusion and extending between the two channels, wherein the two channels form the protrusion and separate a portion of the protrusion from the two side walls;

a lock end located at an end of the protrusion not connected to the base and extending from the protrusion perpendicularly or in an angled manner;

a slot provided on an opposite end of the base without a lock end, comprising a hollow and extending from the base towards a roof; and a printed circuit board inserted into the hollow within the slot and comprising conductive contact members; and a conductive material extending between the triggering member and the conductive contact members.

2. The smart glove according to claim 1, wherein the glove comprises:

a main part for covering at least an upper surface of a hand; a band connecting two side portions of the main part;

a finger part for covering an index finger of a user partially or completely; and a finger opening provided on the main part, wherein a thumb of the user pass through the finger opening.

3. The smart glove according to claim 1, wherein the slide is made of a plastic material.

4. The smart glove according to claim 1, wherein the slide further comprises:

two gripping ends extending towards each other from ends of the two side walls away from the base, and an upper clearance between the two gripping ends.

5. The smart glove according to claim 4, wherein a side aperture is provided on each of the two gripping ends.

6. The smart glove according to claim 5, wherein the side aperture is provided on a part where the two gripping ends are united with the two side walls.

7. The smart glove according to claim 1, wherein the slide further comprises an upper wall connecting the two side walls at a top.

8. The smart glove according to claim 7, wherein at least one upper clearance is provided on the upper wall.

9. The smart glove according to claim 1, wherein a protective element comprises a protective wall surrounding the triggering member, a protective base comprising a lower aperture, wherein the triggering member passes through the lower aperture; and a middle layer comprising a protuberance in a middle portion of the middle layer extending in an opposite direction of the protective base.

10. The smart glove according to claim 9, wherein the protective element is made of a plastic material.

11. The smart glove according to claim 10, wherein the protective element is positioned next to an index finger.

12. The smart glove according to claim 1, further comprising a lining below the triggering member, a fabric on sides of the lining, and a leather above the triggering member.

13. The smart glove according to claim 12, wherein the conductive material is coupled to a lower surface of the triggering member.

14. The smart glove according to claim 1, wherein the conductive material is a conductive yarn.

15. The smart glove according to claim 1, wherein the conductive material is a conductive dye.

16. The smart glove according to claim 1, wherein the conductive material is a conductive wire.

17. The smart glove according to claim 1, wherein the conductive material comprises one or more of a group comprising a conductive yarn, a conductive dye and a conductive wire.

18. The smart glove according to claim 1, further comprising an electronic module inserted within the slide, wherein the protrusion is configured to move downward relative to the base to enable removal of the electronic module from the slide.

* * * * *